(12) United States Patent
Lai

(10) Patent No.: US 6,987,782 B2
(45) Date of Patent: Jan. 17, 2006

(54) METHOD AND APPARATUS FOR DETECTING ROBBED BIT LOCATION IN PCM MODEMS AND THE LIKE

(75) Inventor: Yhean-Sen Lai, Warren, NJ (US)

(73) Assignee: Agere Systems, Inc., Allentown, PA (US)

( * ) Notice: Subject to any disclaimer, the term of this patent is extended or adjusted under 35 U.S.C. 154(b) by 911 days.

(21) Appl. No.: 09/828,632

(22) Filed: Apr. 6, 2001

(65) Prior Publication Data

US 2002/0181414 A1 Dec. 5, 2002

(51) Int. Cl.
H04J 3/12 (2006.01)
H04B 3/20 (2006.01)

(52) U.S. Cl. .................. 370/523; 370/286; 370/292

(58) Field of Classification Search ................ 370/522, 370/523, 286, 292
See application file for complete search history.

(56) References Cited

U.S. PATENT DOCUMENTS

| | | | | |
|---|---|---|---|---|
| 5,007,047 A | * | 4/1991 | Sridhar et al. | 370/286 |
| 5,761,247 A | * | 6/1998 | Betts et al. | 375/316 |
| 6,002,713 A | * | 12/1999 | Goldstein et al. | 375/222 |
| 6,108,354 A | * | 8/2000 | Scull et al. | 370/523 |
| 6,115,395 A | * | 9/2000 | Norrell et al. | 370/523 |
| 6,201,842 B1 | * | 3/2001 | Kim | 375/346 |
| 6,212,207 B1 | * | 4/2001 | Nicholas | 370/523 |
| 6,272,171 B1 | * | 8/2001 | Okunev et al. | 375/222 |
| 6,317,419 B1 | * | 11/2001 | Olafsson et al. | 370/292 |
| 6,643,270 B1 | * | 11/2003 | Demjanenko et al. | 370/282 |
| 6,650,657 B1 | * | 11/2003 | Abdelilah et al. | 370/474 |

* cited by examiner

Primary Examiner—Ricky Ngo
Assistant Examiner—Feben Haile
(74) Attorney, Agent, or Firm—Synnestvedt Lechner & Woodbridge LLP

(57) ABSTRACT

A method and apparatus for detecting the location of robbed bits by a digital communications network. A complete echo cancellation circuit also is disclosed employing the robbed bit detection method and apparatus in which the coefficients of the echo cancellation FIR filter are trained simultaneously during the detection of the position of the robbed bit or bits.

26 Claims, 5 Drawing Sheets

METHOD AND APPARATUS FOR DETECTING ROBBED BIT LOCATION IN PCM MODEMS AND THE LIKE

FIELD OF THE INVENTION

The invention pertains to modems and other transceiver devices. More particularly, the invention pertains to the detection of the location of robbed bit signaling in the forward echo path of a digital communications network.

BACKGROUND OF THE INVENTION

Modems are transceiver devices that allow digital data to be transmitted between pieces of digital equipment, such as computers, via the telephone lines.

Over the past few decades, several standards for communication via modems have been developed. Two of the more recent standards that has been promulgated by the ITU (International Telecommunications Union), formerly known as the CCITT, are ITU-T recommendations V.90 and V.92, incorporated herein by reference.

Most households couple to the local central office of the telephone company through a two wire twisted pair connection. Communication over the two wire twisted pair typically is in analog form. Accordingly, the modem converts the digital data to be transmitted via the telephone network into an analog format that can be transmitted via the twisted wire pair, analog, portion of the telephone network. At the central office of the telephone company, the data is converted into digital format at 64 KB per second and the data is transmitted between central offices in digital format. If the second customer at the opposite end of the telephone call also is coupled to the central office via a twisted wire pair, analog, portion of the network, the data is converted back to analog at the central office closest to the second customer and transmitted to the second customer over the twisted wire pair. The second customer's modem receives the data, converts it back to digital and sends it to the computer.

However, in recent times, many customers of telecommunications services, and particularly any large scale customer of telecommunications services, couple to the central offices through a digital connection, such as a T1 or a T3 connection, well known to those of skill in the art. Certainly, the vast majority, if not all, of Internet Service Providers (ISPs) couple to the telephone company central offices directly in digital.

Generally in the telecommunications industry, as well as in this specification, the following terminology is used. Data transmitted from an individual household customer (subscriber) to an ISP is termed upstream communication. Data transmission from an ISP to a subscriber is termed downstream communication. In accordance with the V.90 protocol, the data format is different in the downstream direction than it is in the upstream direction. In the V.90 standard, modem transmission in the upstream direction is an analog signal in accordance with the older V.34 standard and is transmitted at a maximum data rate of 31.2 kilobits per second (Kbps). However, downstream communication is a PCM (pulse code modulated) signal that can be transmitted at a maximum rate of 56 Kbps per second. In the V.92 standard, communication the both directions is PCM at a maximum rate of 56 kbps.

FIG. 1 is a block diagram generally illustrating modem-to-modem communications through a public telephone network. The system will be described in connection with a public telephone network household customer exchanging data with an Internet service provider (ISP). Let us assume the household customer and the ISP are coupled to different central offices of the public telephone network.

The customer at computer 12 inputs and sends data to the ISP at 28. The computer 12 includes a built-in UART and, therefore, sends out a serial digital signal to the modem 14. The modem converts the serial digital signal to comply with the V.90 standard upstream protocol and puts it out on the public telephone network 20.

Within the telephone network, communication between central offices is digital, rather than analog. Accordingly, the analog signal is encoded by a CODEC 22 into a 64 Kbps signal. In particular, the received analog signal is sampled at a rate of 8 KHz and digitized at an 8 bit resolution to produce a 64 kbps digital PCM signal. The 64 kbps standard is known in the United States as the $\mu$-law standard and in Europe as the A-law standard. The information is digitally transmitted between central office 24 and central office 26.

If the other customer (the ISP) had been coupled to the telephone network through a twisted wire pair, the digital signals received at central office 26 from central office 24 would be passed through another CODEC (not shown) to be decoded back to analog form. The decoded analog signals would then be forwarded to the receiving customer.

However, as previously noted, a high volume customer of the public telephone network, such as ISP 28, would normally have a pure digital connection to the central office 26. Accordingly, ISP 28 would not use a CODEC in central office 26, but instead would receive the data directly in digital form over a digital link such as T1 line 30.

In the opposite direction, ISP 28 outputs digital data to central office 26 via T1 line 30. This data is transmitted in digital form to central office 24. CODEC 22 in central office 24 decodes the digital data and transmits it to the customer's modem 14.

FIG. 2 is a more detailed block diagram illustrating the typical connection between a household and an ISP through a public telephone system. At the household end, the modem 214 includes a transmitter 203, a receiver 205, a CODEC 209 and a hybrid circuit 208. Within the modem, there are separate transmit and receive data paths. Accordingly, digital data from transmitter 203 is transmitted over transmit path 204 to CODEC 209. CODEC 209 converts the data from digital to analog for transmission over the twisted wire pair 211. In the receive direction, CODEC 209 converts data received over the twisted wire pair 211 from analog to digital and transmits it over the receiver path 210 to the receiver 205. Since the analog portion 211 of the public telephone network, to which the household customer directly couples, is a two wire, analog system, the modem 214 includes a hybrid circuit 208 to interface between the CODEC 209 and the analog portion of the public telephone network 211. In the transmit direction, hybrid circuit 208 takes the transmit (i.e., upstream) data on transmit path 207 from the CODEC 209 and places it on the two wire portion 211 of the telephone network. In the downstream direction, hybrid circuit 208 selects and isolates the downstream data, on transmit on the two wire portion 211 of the telephone network and forwards it to the CODEC 209 on the receive wire path 213.

There is almost always an impedance mismatch between the customer's telephone equipment and the public telephone network. This impedance mismatch has the unfortunate effect of causing an echo at the hybrid circuit 208. The echo occurs in both directions. For instance, data transmitted from the modem 214 through the hybrid 208 is reflected back on the receive path 210 in the modem as illustrated by arrow 212.

Likewise, downstream data from the ISP via the public telephone network also is reflected at hybrid 208, back to the ISP, as illustrated by arrow 215.

At the central office 229, there is another hybrid circuit 224 and CODEC circuit 226 serving essentially the same functions as the aforementioned hybrid circuit 208 and CODEC 209. Second hybrid circuit 224 is the interface between the analog two wire portion 211 of the public telephone network and the digital, four wire inter-central-office portion 217 of the network. Hybrid circuit 224 also creates echos in both directions. The echo 225 from hybrid circuit 224 passes back through hybrid circuit 208 and reaches the receive data path 210 in modem 214. Likewise, the ISP also receives a second echo 227 off of the hybrid circuit 224. Accordingly, typically, the customers at both ends link, e.g., the ISP and the household customer, are subject to at least two echos.

Typically, because the hybrid circuit 208 in the customer's own equipment as well as the hybrid circuit 224 in the customer's local central office are physically close to the customer, both of the echos 212 and 225 are almost simultaneous with the actual transmission of the data. Accordingly, both of these echos are herein termed "near echos". Accordingly, the near echos experienced by the customer's modem 214 and computer can often be a problem. Nevertheless, many modems have near echo canceller circuits to correct for corruption of downstream data by the near echo signals.

Both of these hybrid circuits 208 and 224 typically are relatively distant from the ISP. Accordingly, the two echos 227 and 215 received at the ISP commonly are sufficiently delayed from the original transmission of the data to be more problematic, i.e., to corrupt data on the receive path at the ISP (upstream data) that is received simultaneously with the far echo signals.

The signals travel through the digital portion 217 of the network to the central office 231 local to the modem 235 of ISP 233.

In order to minimize the effect of far and near echo, therefore, a digital loss of approximately six decibels (dB) typically is incorporated into hybrid circuits so as to reduce the amplitude of the echo. However, even with the incorporation of the digital loss, far echo can sometimes still create sufficient noise to corrupt valid data.

Thus, in order to further compensate for echo, digital communications equipment (e.g., modems) commonly include a far echo canceller circuit. FIG. 3 is a block diagram of an echo canceller circuit of the prior art. The transmit signal from transmitter 300 on transmit path 301 is fed out to the digital network 302. The transmit signal also is fed into an echo cancellation circuit 303. The echo cancellation circuit includes a bulk delay line buffer 304 and a Finite Impulse Response (FIR) filter 306. FIR 306 receives the transmit signal from transmit wire pair 301 through bulk delay line buffer 304 and generates an echo cancellation signal that can be used to cancel the far echo signal portion that returns from the network. The FIR circuit 306 determines during a training phase at the beginning of each call, the impulse response for the channel, emulates it, and applies it to the data transmitted from transmitter 300 so that the echo cancellation signal 305 emulates the echo signal. The bulk delay line buffer 304 is the circuit that determines and causes the necessary delay in order to cause the output from the FIR circuit 306 to be simultaneous with the receipt of the far echo.

As is well known in the art, each call starts with a training phase before any real data is transmitted. During the training phase, the run trip delay of the far echo as well as the impulse response of the channel for any given telephone call is determined. Accordingly, a processor 312 in the modem determines the round trip delay and the necessary coefficients for the FIR circuit 306 from the handshaking data and sends the data to the bulk delay line buffer 304 and the FIR, respectively. The delay circuit 304 will then delay passing the transmit data from transmit path 301 to the FIR circuit 306 for the appropriate duration, namely, the round trip delay, and the FIR will attenuate and otherwise condition the transmit signal to emulate the echo signal. Subtractor 310 subtracts the output of FIR circuit 306 from the receive data path 308 in order to cancel the far echo component that appears on receive data path 308.

Another noise factor inherent in telephony communications is "robbed bit" noise. In particular, in the digital portion of the network between telephone company central offices, the least significant bit (LSB) of every sixth data sample is utilized for synchronization. In the United States, for instance, there are two types of robbed bit loss, termed type A and Type B. In type A robbed bit systems, for example, the LSB of every sixth data sample (each data sample comprises 8 bits) is forced to digital one regardless of the actual data content. Further, if a connection is routed through a plurality of central offices between the two termination points of the connection, a robbed bit may be inserted for each central office through which a particular call is routed such that there may be several robbed bits every six samples. As will become clear from the discussion below, the present invention is applicable regardless of the particular robbed bit protocol utilized or the number of robbed bits inserted.

In voice communications, for which, of course, the telephone network was originally constructed, the loss of that bit is imperceptible to the listener and, therefore, unimportant. However, in PCM data communications over the telephone network, the robbed bit must be accounted for. Particularly, data cannot be sent in that bit position since it will be corrupted in the digital portion of the network.

Further, the far echo that comes back through the digital network includes robbed bits. Accordingly, the echo cancellation signal generated by echo cancellation circuit 303 will not exactly match the actual echo signal because the actual echo contains robbed bits, whereas the signal that was transmitted on transmit path 301, and, therefore, was used to create the echo cancellation signal did not contain robbed bits.

U.S. patent application Ser. No. 09/392,380, filed Sep. 9, 1999, assigned to the same assignee as the present application and fully incorporated herein by reference, discloses an improved far echo canceller for PCM modems that includes robbed bit compensation.

FIG. 4 is a block diagram of the front end of a V.90/V.92 standard "central" modem 401. As used herein, the term central modem refers to a modem that couples directly to the digital portion of the network without passing through a two wire twisted pair, analog connection. Thus, a central modem such as might be found in the facilities of an ISP or other large-scale telephony customer that can hook directly to the digital portion of the telephone network transmits and receives in PCM format. Thus, for example, referring to FIG. 1, the central modem would be the modem of ISP 28, which transmits and receives in PCM.

The central modem transmits data on transmission wire pair 402 to the digital network 404. The digital network modifies the signal to insert the robbed bit once every six samples. Thus, when the far echo comes back from the hybrid circuit at the far central office on receive wire pair 406 and the hybrid circuit of the customer's modem, the echo typically is different due to the addition of the robbed bit to the original signal.

A robbed bit may be added in the downstream signal as well as in the echo of the upstream signal. In fact, if a call is routed through several central offices between termination points, several robbed bits may be inserted in each direction. The robbed bits inserted in the upstream direction in the actual echoed signal are of less significance because of the digital loss circuitry which attenuates the echo. Specifically, by the time an upstream robbed bit returns in an echo to the transmission source, it has gone through at least one digital loss circuit and is therefore of almost negligible amplitude. The downstream robbed bit does not experience the digital loss. Thus, the robbed bits added in the downstream direction are the ones that are of more concern to the performance of central ones PCM modems.

The front end of the central PCM modem includes a far echo canceller circuit 410. This far echo canceller comprises a robbed bit generator 412, a bulk delay line buffer 414, a FIR 416 and a subtractor 418.

In order to incorporate robbed bit correction into the echo cancellation scheme, the location of the robbed bit must first be determined. The information necessary to determine the position of the robbed bit is obtained from the other modem at the opposite end of the connection during the training phase at the commencement of a communication link. Particularly, the central PCM modem sends a training signal to the customer's modem. In connection with the receipt of the training signal, the customer's modem detects the position of the robbed bits. The customer's modem then sends the information of the position of the robbed bits back to the central PCM modem. That information is used by the robbed bit generator in the echo canceller circuit 412 to modify the signals it receives from the central PCM modem transmitter to add in the effect of the robbed bit. That modified signal is then sent to the bulk delay line buffer 414.

During the training phase, the central PCM modem also determines the time delay of the far echo by measuring the round trip delay during a portion of the start up protocol in which the customer's modem is not transmitting any data. This allows the central PCM modem to receive the far echo signal without any other data being placed on the line. This measurement is well known in the prior art. The bulk delay line buffer 414 then delays the output of the modified signal to the FIR circuit 416 for the determined round trip delay. The FIR circuit 416 calculates and applies the impulse response of the channel to the signal and outputs an echo cancellation signal to subtractor 418 in order to overlap and cancel the far echo received from the digital data network 404 on receive line 406. The output on line 420, termed the residual signal, is then forwarded to the receiver 424 of the central PCM modem. As illustrated by feedback line 426, the FIR circuit includes feedback for continuously updating the coefficients of the FIR circuit.

Once the position of one robbed bit is determined, then the position of all robbed bits is known since they occur at regular intervals. The central PCM modem digital signal processor 428 also must determine what type of robbed bit protocol is being used on the network. This information also is typically determined during training and is well known in the art. Alternately, the PCM modem may simply be pre-set to a particular type of robbed bit compensation since, frequently, it is known in advance what type of public telephone network the modem would be used in connection with and particularly what type of robbed bit protocol is used on that network.

The position of robbed bits in the downstream direction can be determined by the remote modem in the V.92 protocol.

It would be beneficial to be able to determine the position of the robbed bit and account for it in the echo cancellation scheme without the need to rely on the modem at the opposite end of the link.

Accordingly, the present invention relates to an improved method and apparatus for detecting robbed bit position in the far echo path in a digital communications network.

SUMMARY OF THE INVENTION

The invention is a method and apparatus for detecting the location of one or more robbed bits in the far echo path in a digital communications network and a method and apparatus for canceling echo in a signal received via a communications network, including cancellation of robbed bits in the echo.

With respect to the detection of the location of robbed bits in an echo signal, the invention includes the steps of transmitting a known training signal over a link with a remote device on a communications network in the absence of any data being transmitted over said link by the remote device, the training signal comprising a plurality of portions into which a robbed bit may be inserted in a known location within those portions; detecting the amplitudes of the echo of those portions of the training signal that are received over the network, and determining from the amplitudes which portions of the echo include a robbed bit; and generating a signal indicating the location of robbed bits in the echo.

With respect to canceling echo in a signal received via a communications network, including cancellation of robbed bits in the echo, the invention includes the steps of providing a path between a transmitter and a receiver of the transceiver whereby signals transmitted onto the network by the transmitter are also provided onto the path; determining a round trip delay for signals transmitted via the network; determining the location of robbed bits inserted by the network by transmitting a known training signal over a link on the network in the absence of any other data being transmitted on the link, detecting the amplitudes of portions of the echo of the training signal that is received from the network, and determining from the amplitudes which portions of the echo include a robbed bit; delaying the signal on the path by a round trip delay through the network; inserting into the signal on the path compensation for the robbed bits inserted into the transmitted signals; generating from the delayed and robbed bit compensated signal on the path an echo cancellation signal; and subtracting the echo cancellation signal from signals received via the network before reception at the receiver.

The apparatus for determining the location of robbed bits in an echo signal comprises a training signal generator for generating a known training signal, i(n), the training signal comprising a plurality of portions into which a robbed bit may be inserted in a known location within the portions; a transmitter for transmitting the training signal, i(n), over a link with a remote device on the communications network in the absence of any data being transmitted over the link by the remote device; a level adapter for generating signals, H(n), indicative of the amplitudes of the echo of the portions of the training signal that are received over the network; and a robbed bit detector for determining from the amplitudes which portions of the echo include a robbed bit; and generating a signal indicating the location of robbed bits in the echo.

DETAILED DESCRIPTION OF THE INVENTION

Figure 1:
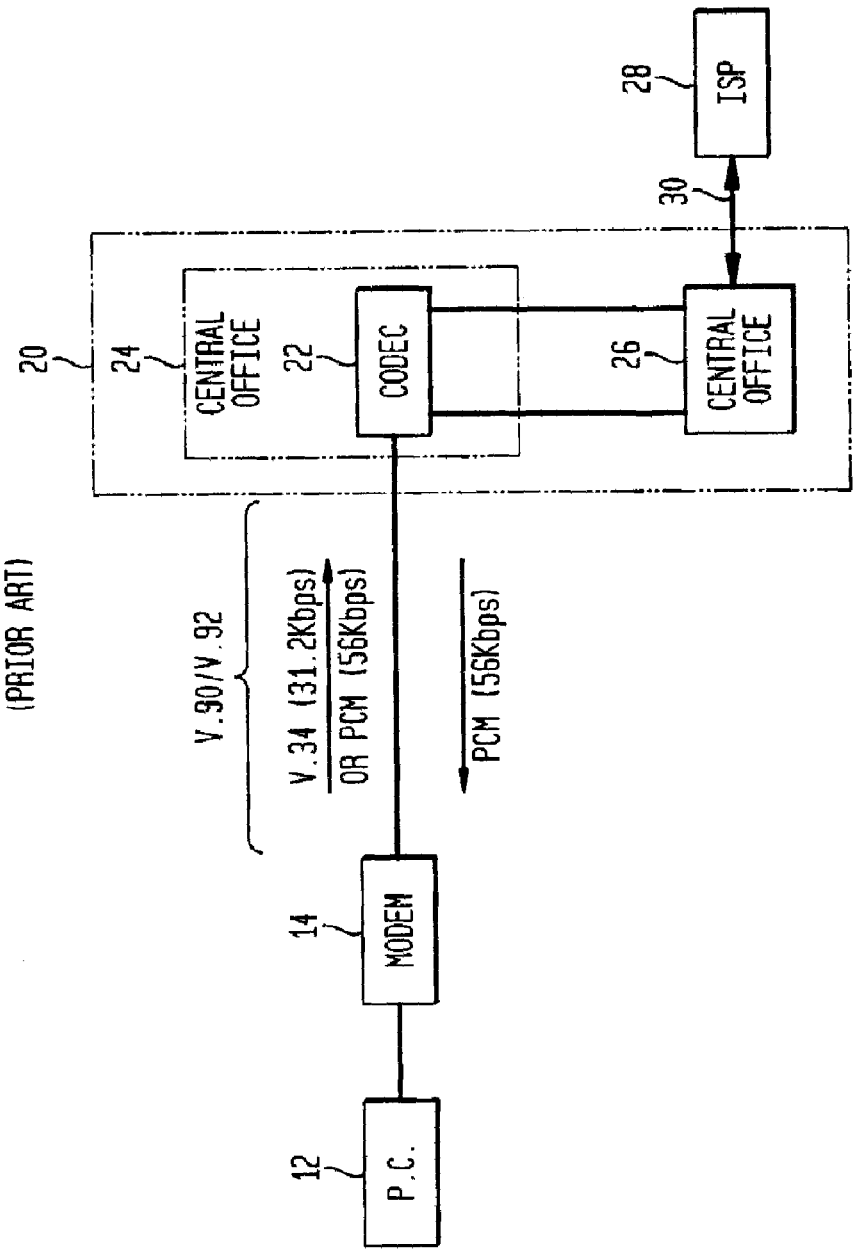
FIG. 1 is a block diagram generally illustrating modem to modem communications through a public telephone network in accordance with the prior art.
Figure 2:
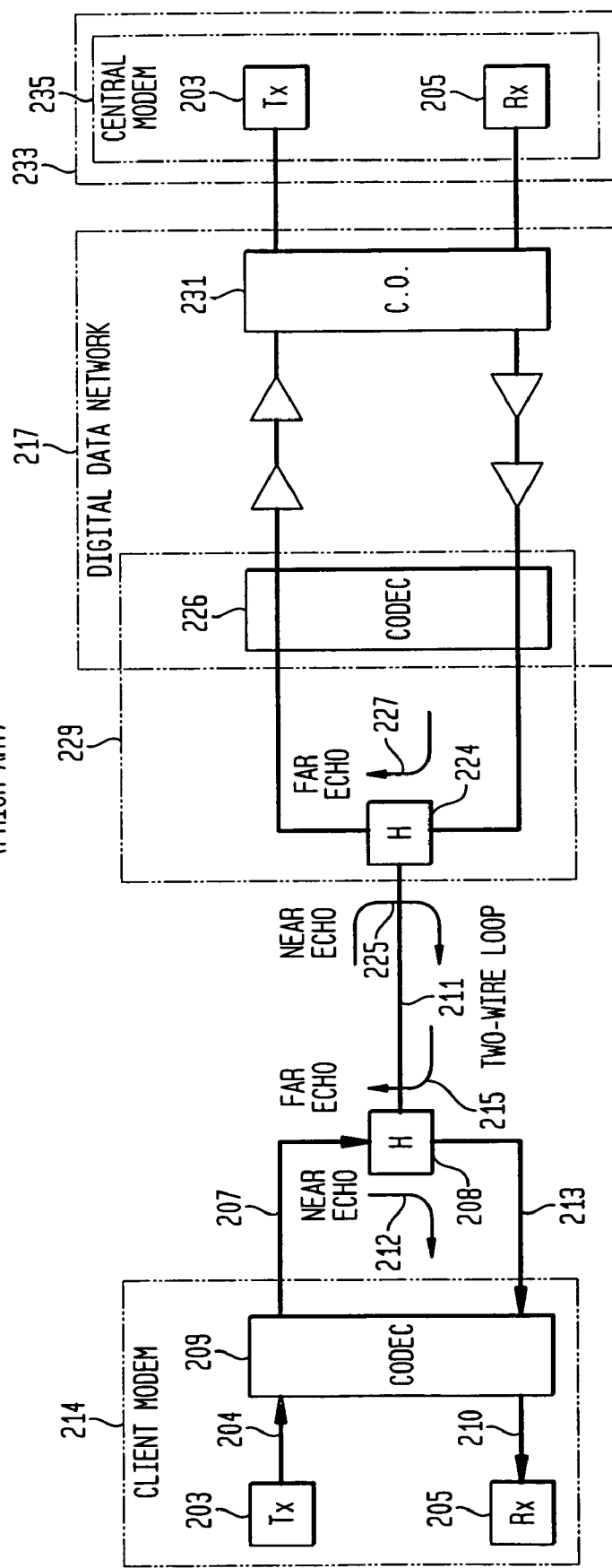
FIG. 2 is a block diagram illustrating echo in an exemplary modem to modem communication link through a public telephone network in accordance with the prior art.
Figure 3:
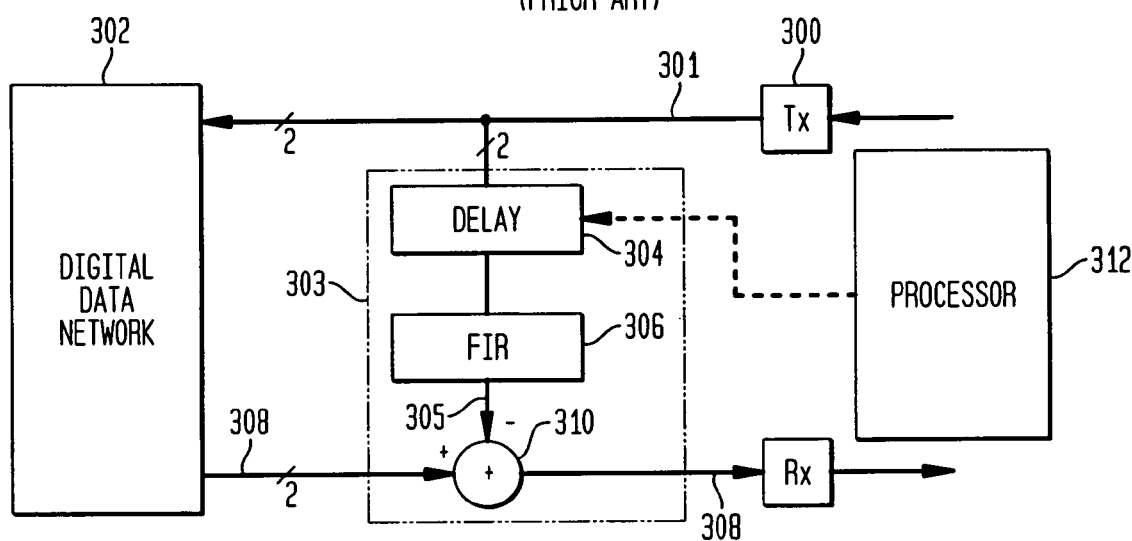
FIG. 3 is a block diagram of an echo cancellation circuit in accordance with the prior art.
Figure 4:
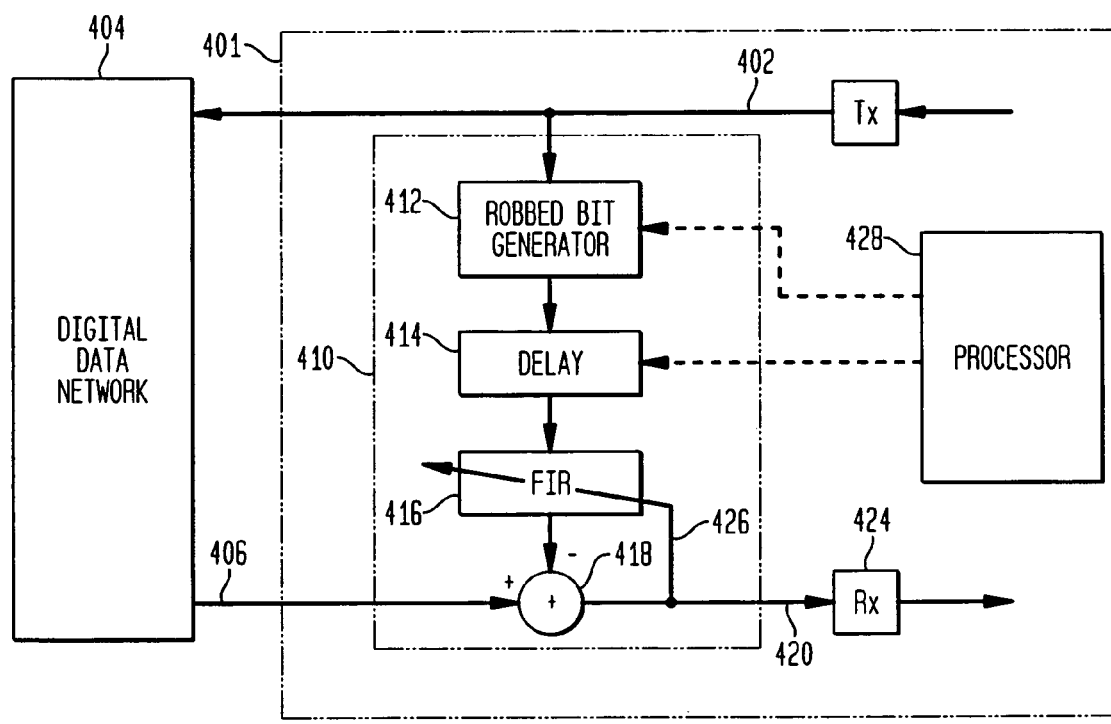
FIG. 4 is a block diagram of a far echo cancellation circuit in accordance with the invention disclosed in U.S. patent application Ser. No. 09/392,380.

The invention is a method and apparatus for detecting the location of one or more robbed bits in a communications network that is at least partially digital and that includes echo as well as a method and apparatus for generating an echo cancellation signal that takes into account robbed bit signaling in the communications network. The invention is particularly suitable for use in PCM central modems (i.e., PCM modems that couple to a communications network through a direct digital connection) and will be described herein for illustrative purposes in connection with a central PCM modem embodiment.

During a training phase at the initiation of a link, the invention determines the location of robbed bits inserted by the network as well as the impulse response of the link and the round trip delay. More specifically, during initial training, the central modem transmits an ideal, two-level, pseudo-random training signal while the remote modem is not transmitting any data. For example, the training signal may comprise successive sample slots, i(1), i(2), i(3), . . . , i(n), of +3900 or −3900 μ-law (i.e., 79 in Ucode) arranged pseudo-randomly. The term pseudo-random is used herein since the signal comprises an irregular or random sequence of slot values (for example, +3900 or −3900), however, the pattern is predetermined (and thus not truly random). Accordingly, during this portion of the training session, the only data which should appear on the receive data path of the central modem is the echo of the transmitted training signal, including robbed bits.

The training signal is used to generate initial tap coefficients for the FIR filter in the echo cancellation circuit. In accordance with the present invention, the position of the robbed bits is determined while simultaneously training the tap coefficients of the FIR filter as described by the equations and algorithms set forth below.

An algorithm is disclosed for detecting the samples within which robbed bits appear (it being known and assumed (1) that the robbed bit is in the least significant bit (LSB) position of that sample and (2) that robbed bits will continue to appear in the same places every six samples) and generating tap coefficients for the finite impulse response (FIR) filter that generates the echo cancellation signal accordingly.

An echo cancellation circuit incorporating the present invention includes a robbed bit generator circuit, a bulk delay line buffer, a modulo and adjust reference signal circuit, an echo signal cancellation circuit (i.e., the FIR filter), a modulo reference signal echo tap generator circuit, a level adapter circuit, a robbed bit detector, and a subtractor for subtracting the echo cancellation signal from the receive signal path before it reaches the modem receiver.

The robbed bit generator circuit, bulk delay line buffer, modulo and adjust reference signal circuit, and FIR filter condition a copy of the signal generated by the transmitter to generate the echo cancellation signal. More particularly, the robbed bit generator adds robbed bits into the signal on the echo cancellation path (once the position and nature of the robbed bit is determined in accordance with the present invention as described below). The bulk delay line buffer delays the signal on the echo cancellation path by the round trip delay of the link (once that value is determined). The modulo and adjust reference signal circuit modifies the signal on the echo cancellation path when a robbed bit is present in the signal on the receive path. The FIR filter applies the FIR tap coefficients to the output of the modulo and adjust reference signal circuit to generate the echo cancellation signal that the subtractor subtracts from the signal on the receive signal path.

The modulo reference signal far echo tap generator circuit receives as inputs the transmitted training signal (preferably after it has been delayed by the bulk delay line buffer) and the coefficients of the FIR filter. It generates and outputs to the level adapter circuit a modulo reference signal needed for updating the taps of the level adapter circuit.

The level adapter circuit receives the error signal and the aforementioned modulo reference signal and generates level adapter taps for use by the modulo and adjust reference signal circuit. These taps contain information as to the level of each sample on the receive data path. Thus, these tap values can be used to determine the position of robbed bits in the echo. Specifically, when the only signal on the receive data path is the echo of the transmitted training signal, the level of samples on the receive data path will differ in a known way for samples that include a robbed bit relative to samples that do not include a robbed bit. Accordingly, the level adapter also sends the tap values to the robbed bit position detector circuit. The robbed bit position detector circuit extracts the amplitude information and determines which samples include robbed bits. Note that it is necessary only to determine the samples that contain robbed bits since it is known and assumed that the robbed bit is in the LSB of those samples. It then provides the location of the robbed bits to the robbed bit generator circuit.

In the equations disclosed below, i(n) are the ideal, two level, pseudo-random, training reference signals and $\{C_e(n)\}$ are the tap coefficients of the far echo canceller FIR filter. N is the length of the FIR filter, i.e., the number of tap coefficients, where $0 \leq e < N$. r(n) is the signal received on the received signal path. In the context of the initial training of the echo canceller taps and the detection of robbed bit position, therefore, r(n) is the echo of the training signal, i(n), which incorporates the impulse response of the link, including robbed bit signaling since, during this training phase, no other data is placed on the communication path.

r'(n) is the echo cancellation signal generated by the echo cancellation circuit. e(n) is the corrected receive signal, i.e., $$e(n)=r(n)-r'(n). \quad \text{(Eq. 1)}$$

In the context of training, the value of e(n) is the error between the actual echo, r(n), and the echo correction signal, r'(n) and is thus hereinafter termed the error signal.

The coefficients of the FIR filter, C(n), are given by $$C(n+1)=C(n)+2\alpha e(n)I'(n) \quad \text{(Eq. 2)}$$

where $\alpha$ is the step size for updating the coefficients of the FIR filter. I'(n) is a modified version of the original training signal in which the values of the individual portions (sample slots) into which the network has inserted robbed bits are altered, but sample slots that do not contain robbed bits remain unchanged. Equation (6) below is used to generate I'(n) and is discussed in further detail below.

The echo cancellation signal r'(n) is given by $$r'(n)=C^T(n)I'(n) \quad \text{(Eq. 3)}$$

where the superscript $T$ represents the transpose function.

The coefficients of the level adapter are given by $$H(n+1)=H(n)-2\beta e(n)S(n) \quad \text{(Eq. 4)}$$

where $$s_l(n) = \sum_{m=0}^{[\frac{N-\text{mod}6(N)}{6}]} C_{\text{mod}6(n-l)+6m} i(n - \text{mod}6(n - l) - 6m), \quad \text{(Eq. 5)}$$

with $0 \le l \le 5$ and $\beta$ is the step size for updating the coefficients of the level adapter circuit.

Finally, the modifies training signal, i'(n) is given by $$i'(n)=\text{sign}(i(n))(i_0+h_{\text{mod}6(n)}\delta)$$

$$\text{sign}(t) = \begin{cases} +1 & t > 0.0 \\ 0 & t = 0.0 \\ -1 & t < 0.0 \end{cases} \quad \text{(Eq. 6)}$$

where $\delta$ is the difference between the amplitude of samples that contain robbed bits and samples that do not contain robbed bits (e.g., 128 for Ucode 79) and $i_0$ is the amplitude of i(n) (e.g., 3900 for Ucode 79), which is a constant. In the above equations, mod6 denotes a modulo operation with an output value from 0 to 5.

It should be understood that $$C^T(n)=[c_{N-1}(n), c_{N-2}(n), \ldots, c_1(n), c_0(n)] \quad \text{(Eq. 7)}$$

$$I'^T(n)=[i'(n-(N-1)), i'(n-(N-2)), \ldots, i'(n-1), i'(n)] \quad \text{(Eq. 8)}$$

$$H^T(n)=[h_0(n), h_1(n), h_2(n), h_3(n), h_4(n), h_5(n)] \quad \text{(Eq. 9)}$$

$$S^T(n)=[s_0(n), s_1(n), \ldots, s_5(n)] \quad \text{(Eq. 10)}$$

The amplitudes of the echo samples received on the receive data path in response to the training signal can be derived from the level adapter tap coefficients, H(n). These amplitude values indicate which samples include robbed bits and thus can be used to add robbed bits into the echo cancellation data path so that robbed bit compensation is incorporated into the generation of the echo cancellation signal by the FIR filter.

Figure 5:
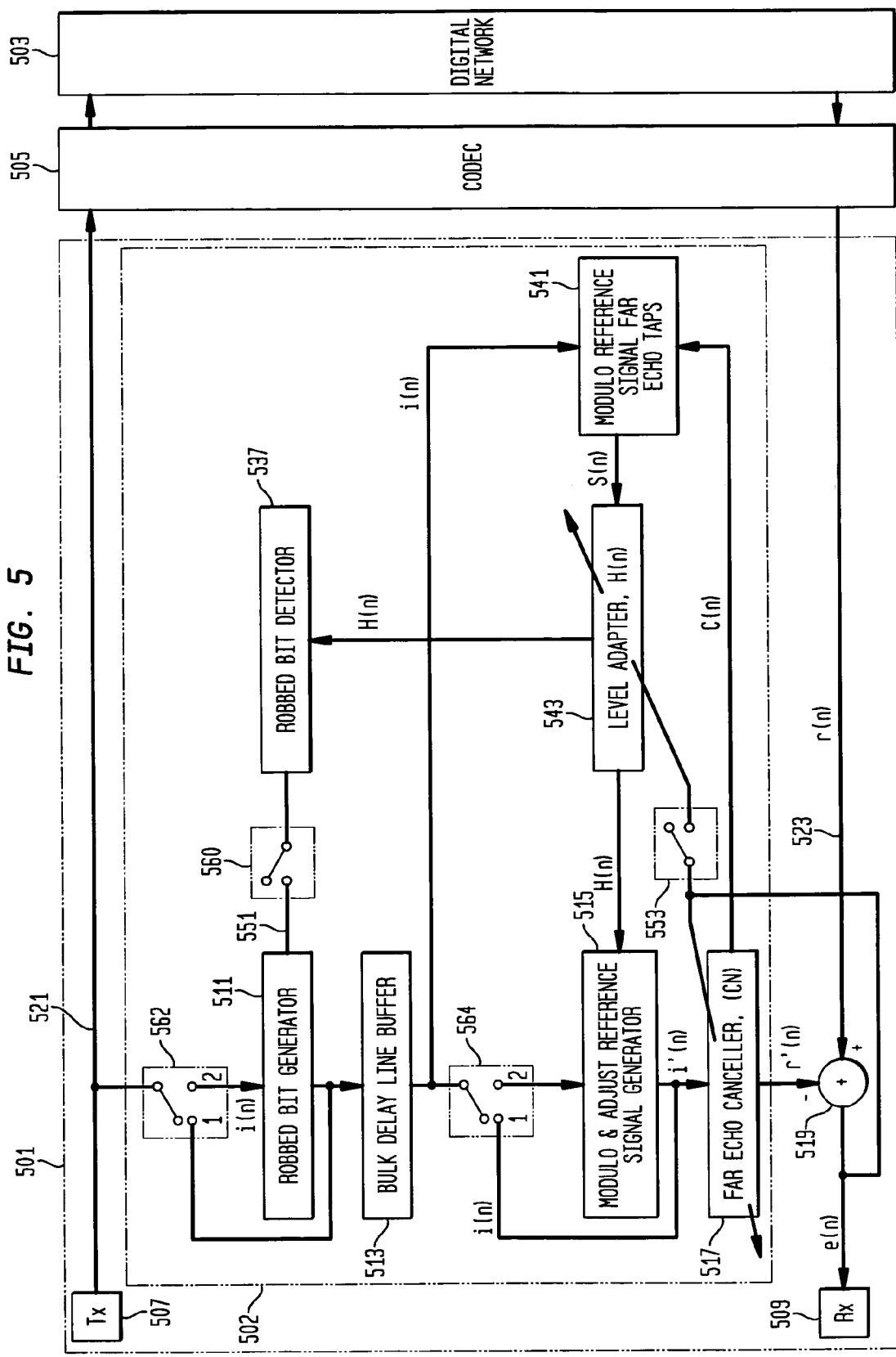
FIG. 5 is a block diagram of a far echo cancellation circuit including circuitry for detecting the position of robbed bits in the echo signal in accordance with the present invention.

FIG. 5 is a block diagram of a central modem 501 employing the present invention. As a "central" modem, it is not subject to near echo, but only far echo. Transmitter 507, receiver 509 and CODEC 505 are essentially standard modem components. An echo cancellation circuit 502 is coupled between the transmit path 521 and the received path 523 within the modem. The transmitter and receiver transmit and receive data in PCM format. The CODEC, among other functions, compands the PCM data (commonly 13 bit wide samples) into 8 bits in accordance with $\mu$-law encoding, which is well know to those of skill in the art. In essence, $\mu$-law encoding is a non-linear compression/expansion encoding scheme.

Echo cancellation circuit 502 includes a robbed bit generator 511, a bulk delay line buffer 513, a modulo and adjust signal generator circuit 515, and a finite impulse response echo cancellation filter 517 in-line between the transmit data path 521 and the receive data path 523. A subtractor 519 subtracts the echo cancellation signal, r'(n), generated by the echo cancellation circuit 502 from the signal, r(n), on the receive data path 523, to generate an output signal, e(n), to the receiver 509 that has the echo removed, i.e., cancelled. During the training operation in which the location of the robbed bit or bits is determined, there will be no signal on the receive data path except for the echo of the training signal. Accordingly, any non-zero signal at the output of the subtractor is an error signal since the purpose of the subtractor is to cancel the echo signal on the receive data path.

The robbed bit generator 511 essentially is the same circuit described in above-identified patent application Ser. No. 09/392,380, which is fully incorporated herein by reference.

Its function is to receive from the robbed bit detector circuit 537 information as to the position of robbed bits and insert robbed bits into the signal on the echo cancellation path (once its location has been determined in accordance with the present invention) so that the echo canceller block 517 will generate an echo cancellation signal, r'(n), that includes compensation for robbed bits. What does differ in the present invention from patent application Ser. No. 09/392,380 is how the position of the robbed bit is determined. In some embodiments, the nature (Type A or Type B) of the robbed bit signaling of the network also is determined by the robbed bit detector circuit 537 and provided to the robbed bit generator. In other embodiments, it may be known ahead of time whether type A or type B robbed bit signaling is being used and, therefore, the robbed bit generator may be preprogrammed to generate the correct form of robbed bits.

Bulk delay line buffer 513 also operates as described in U.S. patent application Ser. No. 09/392,380. Particularly, during training, the round trip delay is determined and provided to the bulk delay line buffer, which then delays the signal on the echo cancellation path by that amount so that the echo cancellation signal, r'(n), arrives at subtractor 519 simultaneously with the actual echo signal on the receive data path 523. Modulo and adjust reference signal generator 515 is a significant portion of the present invention. Its function will be described in more detail below. Briefly, however, it executes Equation 6 so that the signal on the echo cancellation path is modified for those sample slots that have a robbed bit inserted by the network and is left unmodified for all other sample slots. The last block that is directly in the echo cancellation path is the far echo canceller

517. Far echo canceller 517 is the finite impulse response filter that executes Equation 3 to generate the actual echo cancellation signal, r'(n).

The circuitry in accordance with the present invention for determining the position of robbed bits in the echo resides primarily in the modulo reference signal for echo taps generator block 541, the level adapter block 543, the modulo and adjust reference signal generator block 515, and the robbed bit detector block 537. In operation, during initial training, transmitter 507 outputs an ideal, two level, pseudo-random, training signal i(n). During training, switch 560 is open and switch 562 is in position 1 such that no robbed bit compensation occurs. Switch 564 is in position 2 so that Modulo & Adjust Reference Signal Generator circuit 515 generates i'(n) The modulo reference signal far echo taps generator circuit 541 receives at one input the training signal i(n) after it has passed through the bulk delay line buffer 513. Since the robbed bit generator 511 is bypassed during training, block 541 is receiving an essentially true copy of the training signal, i(n), except that it has been delayed. Block 541 receives at a second input the filter coefficients C(n) from far echo canceller 517. Block 541 essentially executes Equation 5 to generate the coefficients S(n) for the level adapter.

Level adapter block 543 receives at a first input the aforementioned coefficients S(n) from block 541. It also receives at a second input the error signal e(n). Level adapter block executes Equation 4 to generate the level adapter signal H(n). The values H(n) are used by the modulo and adjust reference signal generator 515 which executes Equation 6 to generate the modified training signal, i'(n). It can be seen from Equation 6 that i'(n) will be close to i(n) for those samples without robbed bits inserted by the network since $h_{mod6(n)}$ will be close to zero (from Equation 4). However, if a robbed bit is inserted then $h_{mod6(n)}$ will have a non-zero value and thus i'(n) corresponding to that sample on a modulo 6 basis will have a different value.

The far echo canceller circuit 517 receives at its input the values i'(n) and generates the FIR filter coefficients C(n) in accordance with Equation 2. It then uses those coefficients to generate the echo cancellation signal r'(n) in accordance with Equation 3.

Turning back to level adapter 543, each coefficient H(n), in accordance with equations 5 and 4, is a 6×1 matrix in which each of the six individual values comprising H(n), i.e., $h_0(n)$, $h_1(n)$, . . . , $h_5(n)$, represent the levels of six consecutive sample slots in the echo signal. During training, the error signal, e(n), includes the effect of the robbed bit. Any sample slots within that group of six consecutive slots that contain a robbed bit will have a particular amplitude which will be different than the amplitude of those sample slots which do not contain a robbed bit. Accordingly, H(n) discloses the locations of robbed bits in the echo. Therefore, the values H(n) are also provided to the robbed bit detector block 537. The robbed bit detector block 537 can be a simple combinational logic circuit that determines from H(n) the sample slots that contain robbed bits and informs the robbed bit generator 511 of the locations of the robbed bits via signal line 551.

Recall that, in both Type A and Type B robbed bit signaling, the robbed bit always appears in the LSB position of the sample slot. Accordingly, once the sample slot is known, the exact bit location of the robbed bit also is known.

In accordance with a preferred embodiment of the invention, a switch 553 is provided to selectively enable or disable the level adapter coefficients, H(n), from being updated.

In operation, the echo canceller is first trained with the level adapter coefficients set to zero and updating of the level adapter disabled. This helps the tap coefficients of the FIR filter converge more quickly. Then, the switch is thrown to enable the level adapter coefficients to be updated.

Simultaneously, these coefficients are observed to derive the amplitudes of the samples and determine the position of robbed bits and insert robbed bits into the echo path signal so that the FIR filter accounts for them when generating the echo cancellation signal.

In accordance with a preferred embodiment of the invention, robbed bit position detection and echo cancellation may be considered to occur in three steps. In the first step, the transmitter issues the two level, pseudo-random, ideal training signal i(n) and switch 553 is in the open position so that the level adapter coefficients are not updated. Further, the coefficients of HT (the transpose of H) are all set to zero, i.e., $H^T$=[0.0, 0.0, 0.0, 0.0, 0.0, 0.0]. Accordingly, the level adapter essentially does not operate during step 1 and no detection of the location of the robbed bit or bits occurs in step 1. It is preferable, however, to include step 1 because it allows the tap coefficients of the far echo canceller 517 to converge toward the appropriate values more quickly.

Then, in step 2, switch 553 is closed thus allowing the level adapter circuit 543 to operate. In this phase, the coefficients of the far echo canceller and the level adapter are updated simultaneously. During this phase of operation, the output, H(n), of level adapter circuit 543 converge to the amplitude values corresponding to the impulse response of the digital network, including robbed bit signaling. More particularly, since the training signal i(n) is an ideal, two level training signal, sample slots which do not contain a robbed bit will converge to one amplitude level while sample slots that do contain a robbed bit will converge to another level. For example, in Type A robbed bit signaling, the LSB of every sixth sample slot is set to one no matter what the PCM data is. For instance, the Ucode symbol 79 corresponds to an amplitude of 3900 µ-law. However, if a robbed bit occurs in a slot, its Ucode symbol may be 78 instead of 79, which corresponds to a µ-law PCM code of 3772. That information is forwarded to the robbed bit detector 537. As previously described, the robbed bit detector simply generates a signal informing the robbed bit generator 511 of the exact bit location of the robbed bits. The robbed bit generator 511 then inserts a one in the indicated bit positions in the echo cancellation path.

Finally, in step 3, the switch 553 is opened again and the switch 564 is switched to position 1 so that i'(n) bypasses the Modulo 8 Adjust Reference Signal Generator circuit 515 and the echo cancellation circuit continues to operate so as to allow the final tuning of the coefficients of the far echo canceller 517 with the robbed bit accounted for.

After training is completed, the device enters into normal operation. The location of the robbed bits will not change during a connection and, therefore, the detection circuiting is bypassed entirely after the training session.

Specifically, for normal operation, switch 560 is open, switch 562 is in position 2 and switch 564 is in position 1. Thus, robbed bit generator 511 operates to compensate for robbed bits while robbed bit detection is disabled (i.e., Modulo & Adjust Reference Signal Generator circuit 515 is bypassed and robbed bit detector 537 is uncoupled from affecting robbed bit generator circuit 511).

Hence, the present invention directly determines the location of the robbed bits inserted by the digital network without the need for the modem at the opposite end to make the determination and send the information back. The invention will detect as many robbed bits as there are in the signal which returns. The robbed bit detector block 537 preferably is designed only to detect robbed bits inserted in the transmit direction and ignore the highly attenuated robbed bits inserted in the receive direction. This is accomplished simply by setting a particular amplitude threshold for indicating a robbed bit in a sample slot. Further, in accordance with the invention, the position of the robbed bit is detected simultaneously with the training of the filter coefficients of the far echo canceller.

It should be understood by those of skill in the related arts that the blocks illustrated in FIG. 5 demonstrate the different functional aspects of the invention, but do not necessarily correspond to different circuits. In fact, any and all of the functions ascribed to those blocks can be performed by a single digital processing device, such as a microprocessor, microcomputer, digital signal processor, state machine, combinational logic circuit, or programmed general purpose computer.

While the invention has been described above in connection with correcting for robbed bits in a far echo cancellation circuit, it can be applied in any application for detecting and/or correcting for signal corruption caused by network signaling. For instance, the present invention can readily be applied to V.92 modems that use PCM communications in both directions. Even further, while the application has been described in connection with a central model, it, of course, can be used in any modem.

It should further be understood by persons of skill in the art that the present invention can be employed with respect to cancellation of near echo signals as well as far echo signals.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of determining the location of robbed bits in an echo signal that has passed through a communications network, a portion of which network is digital, said method comprising the steps of:
    (1) transmitting a known training signal, i(n), over a link with a remote device on said communications network in the absence of any data being transmitted over said link by said remote device, said training signal comprising a plurality of portions into which a robbed bit may be inserted in a known location within said portions;
    (2) detecting the amplitudes of the echo of said portions of said training signal that are received over said network, and determining from said amplitudes which portions of said echo include a robbed bit; and
    (3) generating a signal indicating the location of said robbed bit in said echos.

2. The method of claim 1 wherein, within said digital portion of said network, data is comprised of a plurality of samples, each sample including a plurality of bits and wherein said network inserts said robbed bits into the least significant bit position of one of said samples at a known interval of every m samples, where m is an integer, and said amplitudes are determined on a modulo m basis.

3. The method of claim 2 wherein step (2) comprises the steps of:
    (2.1) generating an echo cancellation signal, r'(n), from said training signal, i(n), that emulates the impulse response of said link by use of a finite impulse response filter having a plurality of filter coefficients, C(n);
    (2.2) generating from said known training signal, i(n), and said filter coefficients, C(n), a modulo reference signal, S(n), having a modulo corresponding to the frequency of robbed bit signaling protocol in said communications network;
    (2.3) subtracting said echo cancellation signal, r'(n), from an echo of said training signal, r(n), to generate an error signal, e(n); and
    (2.4) generating from said error signal and said modulo reference signal, a level adapter signal, H(n), said level adapter signal comprising a plurality of amplitude values, each corresponding to a portion of said error signal, e(n), said amplitude values being indicative of the existence of a robbed bit in said portion of said error signal;
    wherein n is an integer representing said different portions of said training signal.

4. The method of claim 3 wherein said training signal is an ideal, two level, pseudo random, signal.

5. The method of claim 3 wherein step (2) further comprises the step of:
    (2.5) generating a modulo and adjust reference signal, i'(n), from said known training signal, i(n), and said level adapter signal, H(n), said modulo and adjust reference signal being equivalent to the training signal, i(n), with respect to portions into which the said communication network has not inserted a robbed bit and being different from the training signal with respect to portions into which the said communications network has inserted a robbed bit.

6. The method of claim 5 wherein step (2.5) comprises solving;

$$i'(n) = \text{sign}(i(n))(i_0 + h_{mod6(n)}\delta)$$

$$\text{sign}(t) = \begin{cases} +1 & t > 0.0 \\ 0 & t = 0.0 \\ -1 & t < 0.0 \end{cases}$$

where

δ is the difference in amplitude of an i(n) corresponding to a portion that does not include a robbed bit and the amplitude of an i(n) corresponding to a portion that not includes a robbed bit.

7. The method of claim 6 wherein step (2.1) comprises solving:

$$r'(n) = C^T(n)I'(n)$$

where $C^T(n) = [c_{N-1}(n), c_{N-2}(n), \ldots, c_1(n), c_0(n)]$ $I'^T(n) = [i'(n-(N-1)), i'(n-(N-2)), \ldots, i'(n-1), i'(n)]$, and N is the length of said finite impulse response filter.

8. The method of claim 7 wherein step (2.1) further comprises solving;

$$s_l(n) = \sum_{m=0}^{[N-\mathrm{mod}6(N)]/6} C_{\mathrm{mod}6(n-l)+6m} i(n - \mathrm{mod}6(n-l) - 6m), \quad \text{with } 0 \le l \le 5$$

to generate said filter coefficients C (n).

9. The method of claim 8 wherein step (2.4), comprises solving;

$$H(n+1) = H(n) - 2\beta e(n) S(n)$$

where

β is the step-size used for updating the level adapter coefficients.

10. The method of claim 9 wherein step (2.2), comprises solving;

$$C(n+1) = C(n) + 2\alpha e(n) I'(n) \quad \text{(Eq. 2)}$$

where

α is the step-size used for updating the coefficients of the finite impulse response filter, C(n).

11. The method of claim 5 wherein step (2) is first performed without performing step (2.4) and wherein said level adapter signal, H(n), is set to a predetermined constant value and then, subsequently, step (2.4) is performed.

12. A method of canceling echo in a transceiver coupled to a communications network that inserts robbed bits into signals on said network, said method including compensation for said inserted robbed bits, said method comprising the steps of:
  (1) providing a path between a transmitter and a receiver of said transceiver whereby signals transmitted onto said network by said transmitter are also provided onto said path;
  (2) determining a round trip delay for signals transmitted via said network;
  (3) determining the location of robbed bits inserted by said network by transmitting a known training signal, i(n), over a link on said network in the absence of any other data being transmitted on said link, detecting the amplitudes of portions of the echo of said training signal that is received from said network, and determining from said amplitudes which portions of said echo include a robbed bit;
  (4) delaying said signal on said path by a round trip delay through said network;
  (5) inserting into said signal on said path compensation for said robbed bits inserted into said transmitted signals;
  (6) generating from said delayed and robbed bit compensated signal on said path an echo cancellation signal; and
  (7) subtracting said echo cancellation signal from signals received via said network before reception at said receiver.

13. The method of claim 12 wherein, within said digital portion of said network, data is comprised of a plurality of samples, each sample including a plurality of bits and wherein said network inserts said robbed bits into the least significant bit position of one of said samples at a known interval of every 6 samples.

14. The method of claim 13 wherein step (3) comprises the steps of:
  (3.1) generating an echo cancellation signal, r'(n), from said training signal, i(n), that emulates the impulse response of said link by use of a finite impulse response filter having a plurality of filter coefficients, C(n);
  (3.2) generating from said known training signal, i(n), and said filter coefficients, C(n), a modulo reference signal, S(n), having a modulo corresponding to the frequency of robbed bit signaling protocol in said communications network;
  (3.3) subtracting said echo cancellation signal, r'(n), from an echo of said training signal, r(n), to generate an error signal, e(n); and
  (3.4) generating from said error signal and said modulo reference signal, a level adapter signal, H(n), said level adapter signal comprising a plurality of amplitude values, each corresponding to a portion of said error signal, e(n), said amplitude values being indicative of the existence of a robbed bit in said portion of said error signal;

wherein n is an integer representing said different portions of said training signal.

15. The method of claim 14 wherein said training signal is an ideal, two level, pseudo-random, signal.

16. The method of claim 15 wherein step (3) further comprises the step of:
  (3.5) generating a modulo and adjust reference signal, i'(n), from said known training signal, i(n), and said level adapter signal, H(n), said modulo and adjust reference signal being equivalent to the training signal, i(n), with respect to portions into which the said communication network has not inserted a robbed bit and being different from the training signal with respect to portions into which the said communications network has inserted a robbed bit.

17. The method of claim 16 wherein step (3.5) comprises solving;

$$i'(n) = \mathrm{sign}(i(n))(i_0 + h_{\mathrm{mod}6(n)} \delta)$$

$$\mathrm{sign}(t) = \begin{cases} +1 & t > 0.0 \\ 0 & t = 0.0 \\ -1 & t < 0.0 \end{cases}$$

where

δ is the difference in amplitude of an i(n) corresponding to a portion that does not include a robbed bit and the amplitude of an i(n) corresponding to a portion that not includes a robbed bit.

18. The method of claim 17 wherein step (2.1) comprises solving:

$$r'(n) = C^T(n) I'(n)$$

where $C^T(n) = [c_{N-1}(n)\ c_{N-2}(n), \ldots, c_1(n), c_0(n)]$
$I'^T(n) = [i'(n-(N-1)), i'(n-(N-2)), \ldots, i'(n-1), i'(n)]$, and
N is the length of said finite impulse response filter.

19. The method of claim 18 wherein step (3.1) further comprises solving;

$$s_l(n) = \sum_{m=0}^{[N-\mathrm{mod}6(N)]/6} C_{\mathrm{mod}6(n-l)+6m} i(n - \mathrm{mod}6(n-l) - 6m), \quad \text{with } 0 \le l \le 5$$

to generate said filter coefficients C(n).

20. The method of claim 19 wherein step (3.4), comprises solving;

$$H(n+1)=H(n)-2\beta e(n)S(n)$$

where
- $\beta$ is the step-size used for updating the level adapter coefficients.

21. The method of claim 20 wherein step (3.2), comprises solving;

$$C(n+1)=C(n)+2\alpha e(n)I'(n)$$

where
- $\alpha$ is the step-size used for updating the coefficients of the finite impulse response filter, C(n).

22. The method of claim 16 wherein step (3) is first performed without performing step (3.4) and wherein said level adapter signal, H(n), is set to a predetermined constant value and then, subsequently, step (3.4) is performed.

23. An apparatus for determining the location of robbed bits in an echo signal that has passed through a communications network, a portion of which network is digital, said apparatus comprising:
- a training signal generator for generating a known training signal, i(n), said training signal comprising a plurality of portions into which a robbed bit may be inserted in a known location within said portions;
- a transmitter for transmitting said training signal, i(n), over a link with a remote device on said communications network in the absence of any data being transmitted over said link by said remote device;
- a level adapter for generating signals, H(n), indicative of the amplitudes of the echo of said portions of said training signal that are received over said network; and
- a robbed bit detector for determining from said amplitudes which portions of said echo include a robbed bit; and generating a signal indicating the location of said robbed bits in said echo.

24. The apparatus of claim 23 further comprising:
- an echo canceller that generates an echo cancellation signal, r'(n), from said training signal, i(n), by use of a finite impulse response filter having a plurality of filter coefficients, C(n), said echo cancellation signal emulating the impulse response of said link;
- a modulo reference signal echo tap generator that generates from said known training signal, i(n), and said filter coefficients, C(n), a modulo reference signal, S(n), having a modulo corresponding to the frequency of robbed bit signaling protocol in said communications network;
- a subtractor for subtracting said echo cancellation signal, r'(n), from an echo of said training signal, r(n), to generate an error signal, e(n);
- wherein said level adapter generates said level adapter signal, H(n), from said error signal and said modulo reference signal, said level adapter signal comprising a plurality of amplitude values, each corresponding to a portion of said error signal, e(n), said amplitude values being indicative of the existence of a robbed bit in said portion of said error signal; and
- wherein n is an integer representing said different portions of said training signal.

25. The apparatus of claim 24 wherein said training signal is an ideal, two level, pseudo random, signal.

26. The apparatus of claim 25 further comprising:
- a modulo and adjust reference signal generator for generating a signal, i'(n), from said known training signal, i(n), and said level adapter signal, H(n), said signal being equivalent to the training signal, i(n), with respect to portions into which said communication network has not inserted a robbed bit and being different from the training signal with respect to portions into which the said communications network has inserted a robbed bit.

* * * * *